(12) United States Patent
Schwitzky et al.

(10) Patent No.: US 8,800,447 B2
(45) Date of Patent: Aug. 12, 2014

(54) SHEET-FED OR WEB-FED PRINTING MACHINE

(75) Inventors: Volkmar Rolf Schwitzky, Würzburg (DE); Johannes Georg Schaede, Wüzburg (DE)

(73) Assignee: KBA-NotaSys SA, Lausanne (CH)

( * ) Notice: Subject to any disclaimer, the term of this patent is extended or adjusted under 35 U.S.C. 154(b) by 812 days.

(21) Appl. No.: 12/084,916

(22) PCT Filed: Nov. 22, 2006

(86) PCT No.: PCT/IB2006/054386
§ 371 (c)(1),
(2), (4) Date: May 13, 2008

(87) PCT Pub. No.: WO2007/060624
PCT Pub. Date: May 31, 2007

(65) Prior Publication Data
US 2009/0095178 A1    Apr. 16, 2009

(30) Foreign Application Priority Data
Nov. 28, 2005    (EP) ..................................... 05405674

(51) Int. Cl.
*B41F 33/04* (2006.01)
*B41F 33/00* (2006.01)
*F16P 3/14* (2006.01)
*B41F 31/30* (2006.01)

(52) U.S. Cl.
CPC ............... *F16P 3/14* (2013.01); *B41F 33/0018* (2013.01); *B41F 31/302* (2013.01)
USPC ............. 101/484; 101/183; 101/480

(58) Field of Classification Search
CPC .... B41F 33/00; B41F 33/0018; B41F 33/045; B41F 33/14; B41F 33/12; B41F 33/04; B41F 33/08
USPC .................. 101/180, 183, 480, 484
See application file for complete search history.

(56) References Cited

U.S. PATENT DOCUMENTS 4,222,325 A * 9/1980 Edwards ......................... 101/137
4,633,777 A   1/1987 Germann
(Continued)

FOREIGN PATENT DOCUMENTS

EP    0132858    2/1985
EP    0132859    2/1985
(Continued)

*Primary Examiner* — David Banh
(74) *Attorney, Agent, or Firm* — Krieg DeVault LLP; Clifford W. Browning

(57) ABSTRACT

The sheet-fed or web-fed printing machine comprises a main unit (1), at least one mobile carriage (2) adapted to be coupled to the main unit for cooperation therewith during printing operations and to be moved away from the main unit during maintenance operations, a control unit for controlling displacement of said mobile carriage toward and away from said main unit, and an access zone (9, 9') surrounding at least partly the mobile carriage for allowing a human operator to get access to the main unit and mobile carriage, which access zone lies outside of the displacement path (10) of the mobile carriage. The printing machine further comprises detection means (11) for monitoring the access zone and detecting presence of a human operator within the access zone. The control unit is operatively connected to the detection means so as to interrupt or prevent displacement of the mobile carriage in case presence of a human operator is detected within the access zone by the detection means and before the human operator penetrates in the displacement path of the mobile carriage.

14 Claims, 5 Drawing Sheets

(56) References Cited

U.S. PATENT DOCUMENTS

| | | | |
|---|---|---|---|
| 4,640,189 A | 2/1987 | Hernandez | |
| 5,007,339 A | 4/1991 | Germann | |
| 5,009,156 A | 4/1991 | Germann | |
| 5,036,763 A | 8/1991 | Germann | |
| 5,042,378 A | 8/1991 | Germann | |
| 5,062,359 A | 11/1991 | Giori | |
| 5,062,360 A | 11/1991 | Germann | |
| 5,136,942 A | 8/1992 | Germann | |
| 5,142,979 A * | 9/1992 | Funada et al. | 101/183 |
| 5,899,145 A | 5/1999 | Schaede | |
| 6,606,949 B1 | 8/2003 | Funabashi | |
| 7,011,020 B2 | 3/2006 | Dunninger et al. | |
| 7,707,936 B2 * | 5/2010 | Schneider et al. | 101/221 |
| 7,735,418 B2 * | 6/2010 | Hoffmann et al. | 101/180 |
| 7,908,969 B2 * | 3/2011 | Caulier | 101/480 |
| 2001/0042462 A1 * | 11/2001 | Nakano et al. | 101/216 |
| 2003/0101882 A1 * | 6/2003 | Dietrich et al. | 101/217 |
| 2004/0125206 A1 * | 7/2004 | Lohmann | 348/155 |
| 2004/0237816 A1 | 12/2004 | Dunninger et al. | |
| 2006/0144265 A1 * | 7/2006 | Dunninger et al. | 101/152 |
| 2007/0018877 A1 * | 1/2007 | Bailey | 341/176 |
| 2007/0227870 A1 * | 10/2007 | Parnell | 200/341 |

FOREIGN PATENT DOCUMENTS

| | | | | |
|---|---|---|---|---|
| EP | 0343104 | | 11/1989 | |
| EP | 0343105 | | 11/1989 | |
| EP | 0343106 | | 11/1989 | |
| EP | 0343107 | | 11/1989 | |
| EP | 0351366 | | 1/1990 | |
| EP | 0415881 | | 3/1991 | |
| JP | 1242249 A | | 9/1989 | |
| JP | 2072954 A | | 3/1990 | |
| JP | 4012854 A | | 1/1992 | |
| JP | 09174820 A | * | 7/1997 | B41F 33/00 |
| JP | 2001080050 A | | 3/2001 | |
| JP | 2002036510 A | | 2/2002 | |
| JP | 2005512840 A | | 5/2005 | |
| WO | WO 03/047862 | | 6/2003 | |

* cited by examiner

SHEET-FED OR WEB-FED PRINTING MACHINE

TECHNICAL FIELD

The present invention relates to a sheet-fed or web-fed printing machine comprising a main unit, at least one mobile carriage adapted to be coupled to the main unit for cooperation therewith during printing operations and to be moved away from the main unit during maintenance operations, a control unit for controlling-displacement of said mobile carriage toward and away from said main unit, and an access zone surrounding at least partly said mobile carriage for allowing a human operator to get access to said units and carriages.

BACKGROUND OF THE INVENTION

Such machines are known for example from U.S. Pat. Nos. 5,062,359 and 5,899,145 and from International Patent Application WO 03/047862. In order to facilitate maintenance operations, some essential parts of the printing machine, needing careful maintenance, are mounted on a mobile carriage, which can be displaced from a working position to a maintenance position upon activation of a control means. In the case of WO 03/047862, two such mobile carriages are provided. Further examples of printing machines with movable carriages are disclosed for instance in European patent applications EP 0 132 858, EP 0 132 859, EP 0 343 104, EP 0 343 105, EP 0 343 106, EP 0 343 107, EP 0 351 366 or EP 0 415 881.

European patent application EP 0 444 227 discloses a safety device for a printing machine wherein first and second pressure-sensitive mat switches are disposed in the path of a mobile inking carriage. The first pressure-sensitive mat switch is disposed below the mobile carriage in the state where this latter carriage is coupled to the printing unit of the printing machine. This first mat switch is adapted to be turned on if an operator stands between the printing unit and the mobile inking carriage when this latter has been retracted. The second pressure-sensitive mat switch is disposed below the mobile inking carriage in the state where this latter carriage is retracted away from the printing unit. This second mat switch is adapted to be turned off if an operator stands behind the mobile inking carriage when this latter is coupled to the printing unit. While the disclosed safety device permits detection of the presence of an operator in the displacement path of the mobile inking carriage, the inherent construction of the safety device implies that the operator must be physically present in the path of the mobile inking carriage in order to trigger the safety device. While, this safety device might be sufficient for low displacement speeds of the mobile carriage (which speeds are usually of the order of 1 meter per minute) as there will be sufficient time for the system to react to the presence of an operator in the path of the mobile carriage, there remains a risk that the system will not react quick enough upon entrance of an operator in the path of the mobile carriage when this latter is displaced at greater speeds. This is especially critical with the safety device of EP 0 444 227 as triggering of the system only occurs upon trespassing of the operator on one of the pressure-sensitive mat switches. A hand or arm of the operator might for instance get caught by the mobile carriage before the operator actually sets a foot on the pressure-sensitive mat switch. An improved solution from the point of view of safety is thus required. In addition, the safety device of EP 0 444 227 actually requires two separate pressure-sensitive mat switches in order to operate adequately, i.e. check for the presence of an operator both in the coupled state and the retracted state of the mobile carriage.

Although human operators are warned of the danger to enter the access zone during displacement of said mobile carriage or carriages, it appeared that security had to be improved.

Further, a need has arisen for a machine with a mobile carriage than can moved more quickly from the working position to the maintenance position without this being detrimental to the security of the human operators. In that respect, in the machines of the prior art, it was a common procedure to limit the displacement speed of the mobile carriage to low levels so as to reduce as much as possible the risk of human operator being caught in the path of the mobile carriage.

SUMMARY OF THE INVENTION

Thus the present invention aims to improve the security of human interventions for maintenance purposes in machines of the above-mentioned type.

These aims are achieved by the sheet-fed or web-fed printing machine according to the invention, comprising a main unit, at least one mobile carriage adapted to be coupled to the main unit for cooperation therewith during printing operations and to be moved away from the main unit during maintenance operations, a control unit for controlling displacement of said mobile carriage toward and away from said main unit, and an access zone surrounding at least partly said mobile carriage for allowing a human operator to get access to said main unit and mobile carriage, which access zone lies outside of the displacement path of said mobile carriage, wherein said printing machine further comprises detection means for monitoring said access zone and detecting presence of a human operator within said access zone, and wherein said control unit is operatively connected to said detection means so as to interrupt or prevent displacement of said mobile carriage in case presence of a human operator is detected within said access zone by the detection means and before the human operator penetrates in the displacement path of the mobile carriage.

Advantageous embodiments of the invention are the subject matter of the annexed dependent claims.

BRIEF DESCRIPTION OF THE DRAWINGS

An embodiment of a printing machine according to the invention will be described hereafter by way of example and with reference to the appended drawing, in which.

EMBODIMENTS OF THE INVENTION

Figure 1:
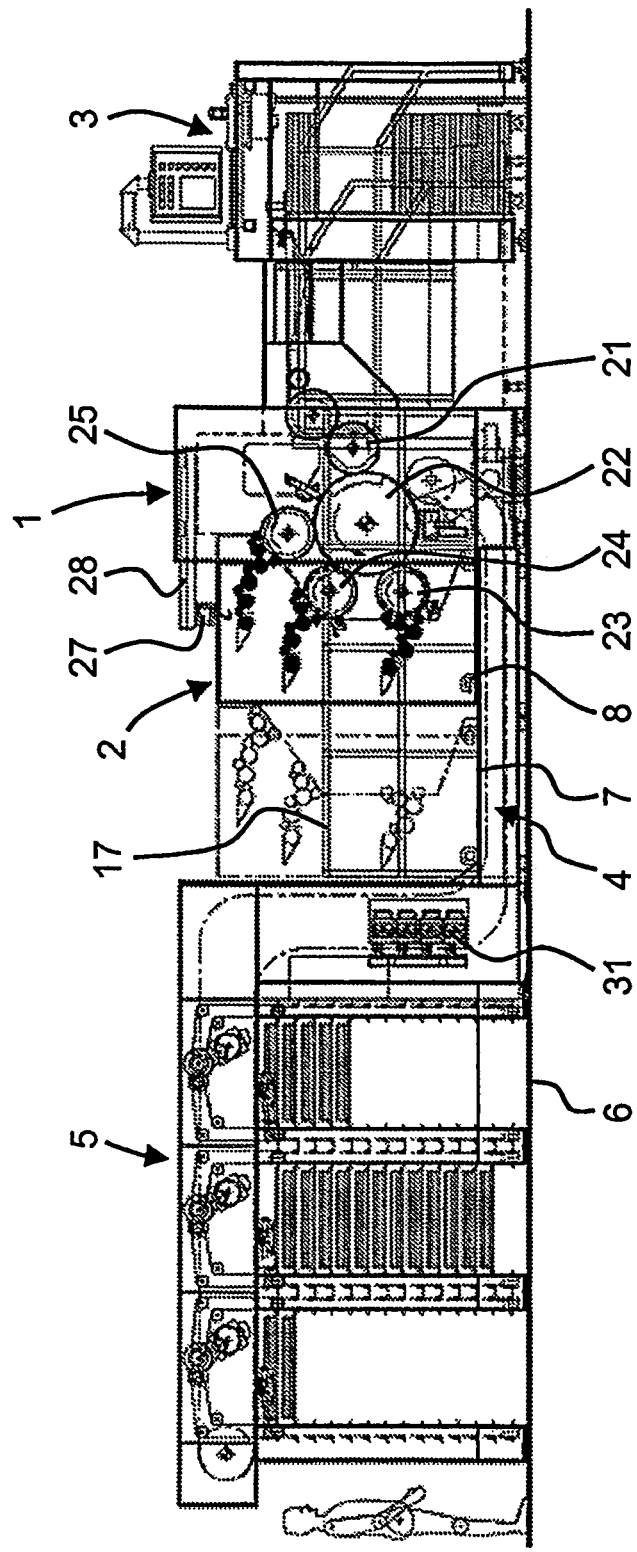
FIGS. 1 to 3 are respectively a lateral elevation view, a plan view and an end elevation view of that embodiment.
Figure 3:
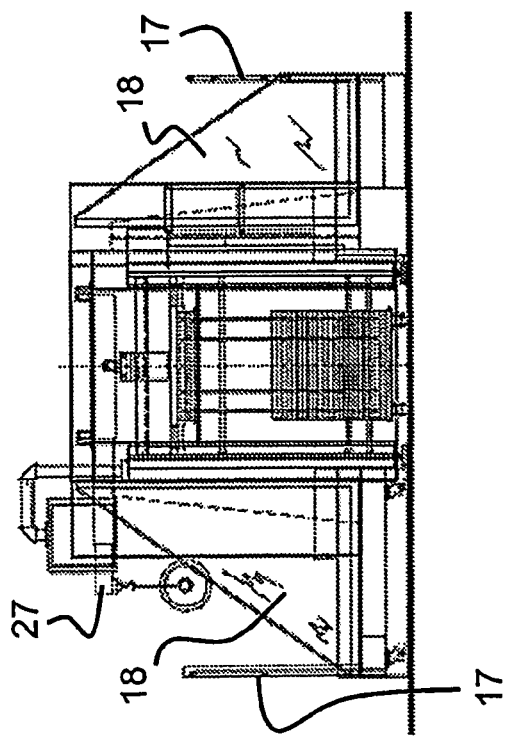
Figure 4:
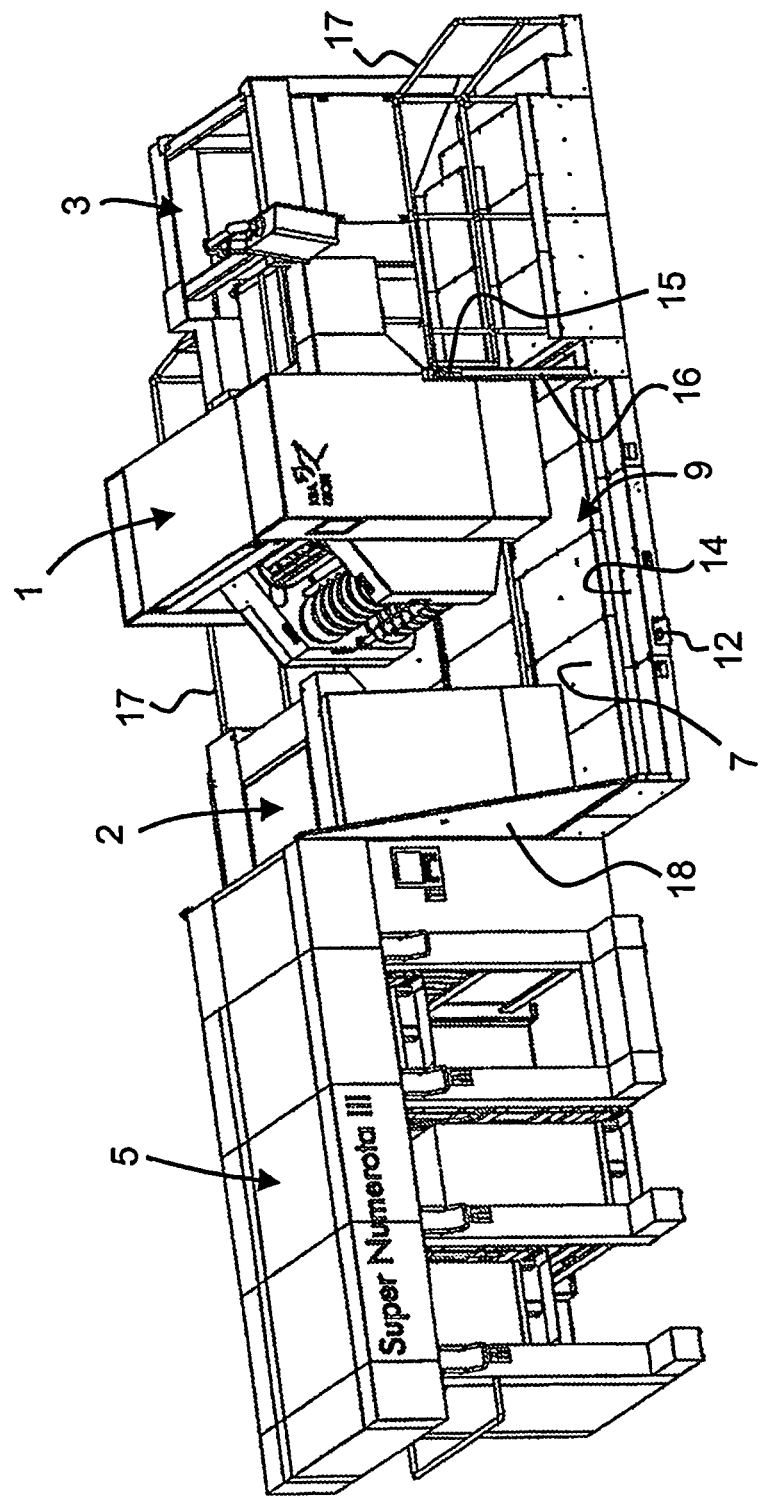
FIG. 4 is a perspective view of the same embodiment, seen from its operation side giving access to the activation device, with the mobile carriage in its maintenance position.

The machine shown in the drawing is a multi-color sheet-fed numbering machine. A stationary part, or main unit, 1 and a mobile part, or mobile carriage, 2 enclose a main arrangement for sheet printing. Stationary part 1 as such forms the printing unit of the numbering machine. It comprises a transfer drum 21, an impression cylinder 22, two numbering cylinders 23 and 24, and an optional third typographic cylinder 25 for printing signatures or other elements. Stationary part 1 receives sheets fed from a feeding device, such as a non-stop sheet feeder 3. Mobile part 2 as such forms the inking unit of the numbering machine and includes inking devices for supplying the necessary inks to the printing parts of the printing unit. After having been printed the sheets are transferred from unit 1 to a sheet conveying system 4, such as a typical chain gripper system with chain-driven gripper bars for holding a leading edge of the printed sheets. The sheets transported by the sheet conveying system 4 are delivered to a delivery unit 5 after having first passed through a drying device 31, such as UV dryer. Stationary unit 1, feeding device 3, sheet conveying system 4 and delivery unit 5 are fixedly mounted on a floor 6 of the printer hall. As shown in FIG. 1, the distance between the right end of delivery unit 5 and the left end of stationary unit 1 is greater than the length of mobile unit 2. The latter is supported on a middle floor 7 extending above the path of the sheet conveying system 4. The printed sheets are thus guided and conveyed under middle floor 7 to the delivery unit 5. In the usual working state the inking unit 2 is linked to printing unit 1 as shown in full line in FIGS. 1 and 2. However, for the purpose of maintenance it is often necessary that workmanship has access to some active element lying between inking unit 2 and printing unit 1. Therefore inking unit 2 is made movable. It comprises displacement means including rollers 8. The latter are guided on rails (not shown in FIG. 1 but appearing in FIGS. 4 and 5), drowned in the middle floor 7. Upon control of a driving motor (not shown) acting on rollers 8, carriage 2 is displaced towards unit 5 as shown in dotted lines on FIG. 1. Carriage 2 is also shown in its open position in FIGS. 4 and 6. Once in the open state, access is allowed to parts of the units 1 and/or 2 which are only accessible from between these units, for example to replace any one of the cylinders 23, 24 or 25 by another cylinder or for any other maintenance operation, such as replacement of components of the inking devices located in the inking unit 2. The replacement of a cylinder can be made by means of the telescopic elevator arm 27 of a crane 28 mounted on the upper portion of the printing unit 1, as shown on FIGS. 1, 3 and 6. This crane 28 can advantageously be retracted completely in the support portion of the printing unit 1 when not in use.

In order to allow a better access to the numbering cylinder 23, the mobile carriage 2 can be provided with known quick-release means for acting on the bearings of numbering cylinder 24 and permitting its separation from the stationary part 1 and its displacement with the mobile carriage 2, in a manner known per se, as for example described in U.S. Pat. No. 5,899,145, the content of which is fully incorporated herein by reference. In such a way, numbering cylinder 24 can be removed from printing unit 1 together with the mobile carriage 2 such that an operator can better access the below-located numbering cylinder 23.

Figure 2:
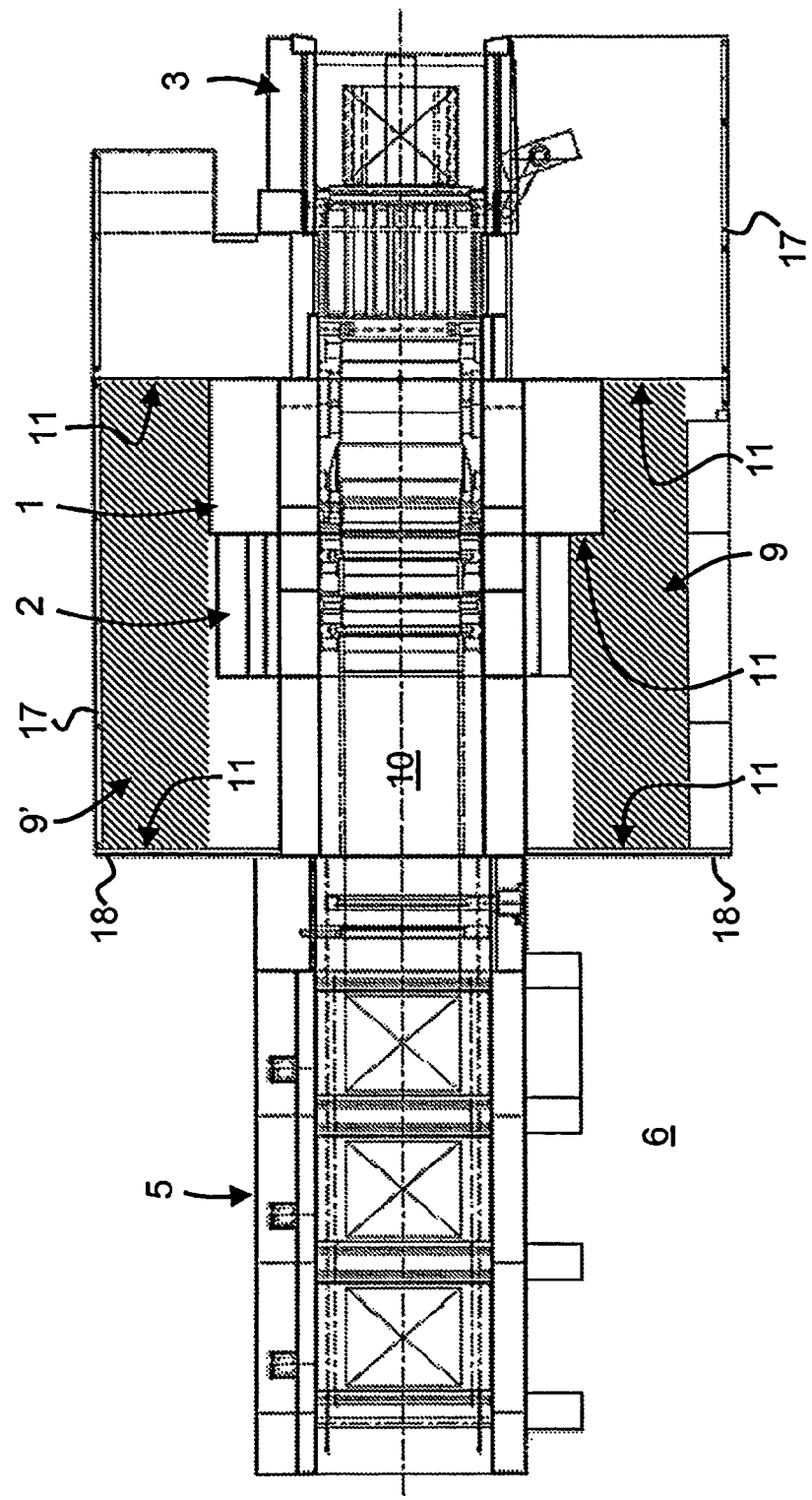

For purpose of security, limited access to middle floor 7 must be preserved. Floor 7 is made extending on each side of units 1 and 2 and is partially surrounded by barriers 17 and side panels 18 (as shown in the Figures) restricting access to the middle floor 7 from certain directions only. Middle floor 7 thus delimits an access zone allowing a human operator to get access to the printing unit 1 or to the inking unit 2 if the latter is displaced away of the printing unit 1. As shown in FIG. 2, access to the middle floor 7 by a human operator is authorized from both sides of the printing machine in this example, a human operator being forces to pass through two access zones designated in the Figures by reference numerals 9 and 9' which are indicated with hatchings. It will be appreciated that access zones 9 and 9' lie outside of the displacement path 10 of the mobile carriage 2.

Figure 5:
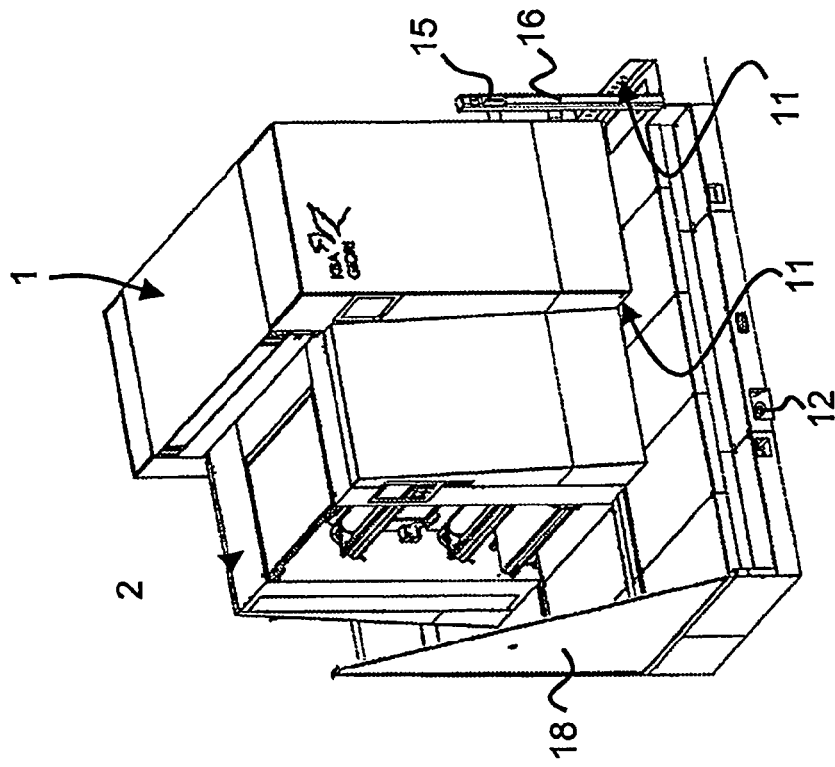
FIG. 5 is an enlarged partial perspective view as in FIG. 4 with the mobile carriage in its working position.
Figure 6:
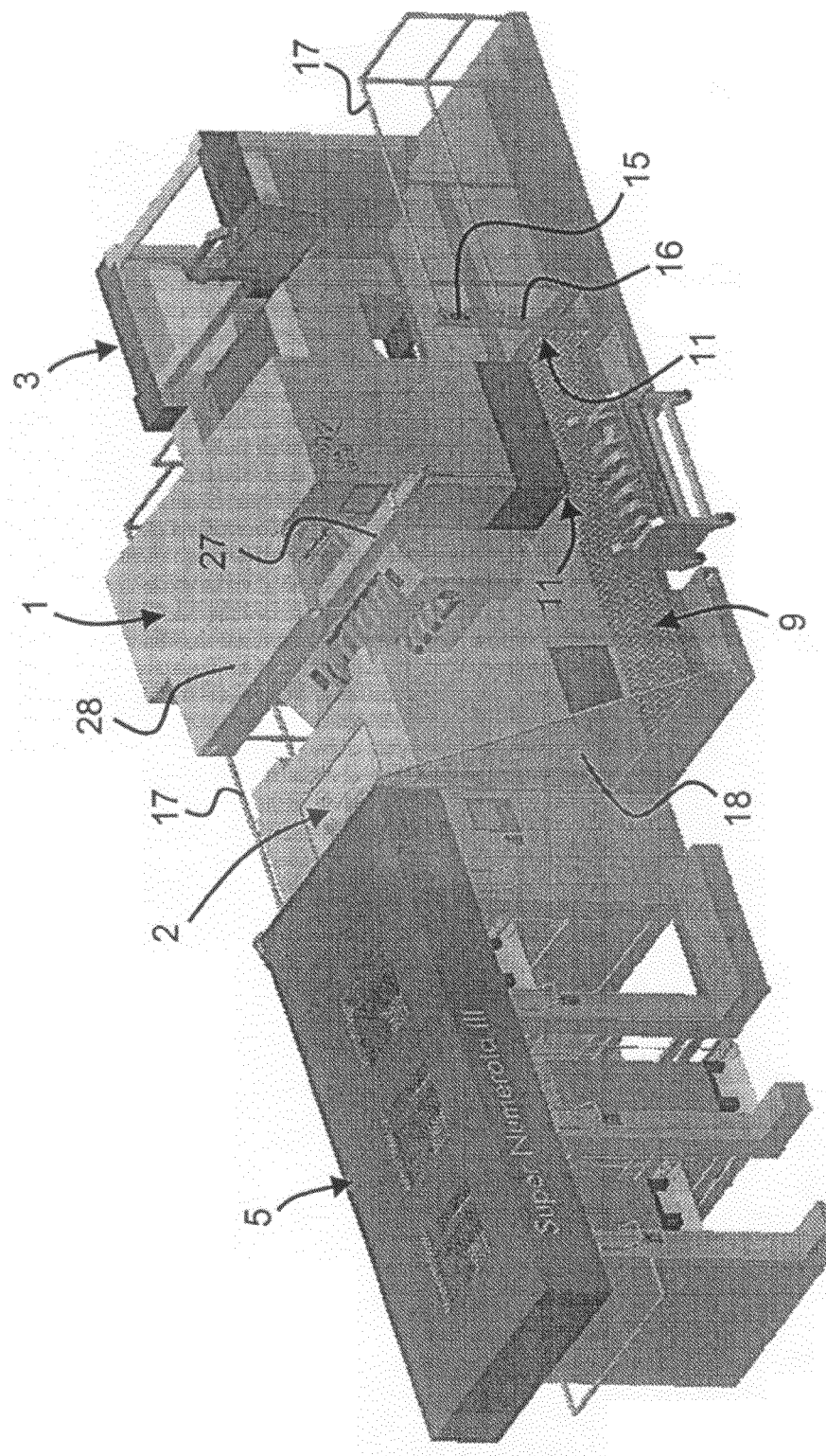
FIG. 6 is a further perspective view as in FIG. 4 showing the crane for removing the numbering cylinders in a working state.

Now for improving the security of the maintenance operations and permitting to accelerate the displacement speed of unit 2, detection means are provided for monitoring access zones 9, 9' to the middle floor 7 and detecting presence of a human operator within these zones 9, 9'. These detection means preferably comprise, in the described embodiment, optical detection means comprising pairs of light sources and photo-receptors 11 disposed at two ends of each access zone 9, 9' for optically scanning the access zone along a horizontal plane parallel to the middle floor 7 and close to the level of the middle floor 7, as illustrated in FIG. 6. More precisely, the light sources and photo-receptors 11 are located, as schematically indicated in FIGS. 2, 5 and 6 on each side of the machine at one end of a longitudinal passage extending from the feeding side of printing unit 1 to the right-hand side of delivery unit 5 where the side panels 18 are located. Scanning of the free transverse passage lying between access zone 9, 9' in the displacement path 10 of the mobile carriage 2 can additionally be provided. The detection means 11 are operatively coupled to control means (not shown) controlling the displacement of carriage 2, in such a manner that the displacement thereof is prevented when presence of a human operator in any one of the access zones 9, 9' is detected, i.e. following interruption of the scanning beams produced by detections means 11. Accordingly, presence of a human operator is detected before this human operator actually penetrates in the displacement path 10 of the mobile carriage 2, which enables to improve security as any move of a human operator towards the central part of the printing machine is thereby anticipated.

In a variant, detection means may consist of pressure-sensitive means able to detect trespassing of a human operator onto the access zones 9, 9' (and optionally zone 10) or of any other suitable means able to react to the presence of a human person in or on access zones 9, 9' (and optionally zone 10).

In addition the security arrangement protecting the machine is completed by an activation device comprising in the described embodiment a control button 12 operable by foot and located (see FIGS. 4 and 5) on the front side of the floor part 7 where a step 14 is provided. In this way, an operator can oversee the access zones 9, 9'' and the area surrounding mobile carriage 2 in its entirety when actuating the control button 12. Preferably, actuation of the control button 12 activates the detection means 11 and initiate the control unit controlling the displacement of mobile carriage 2. The displacement of the mobile carriage 2 can then be triggered by the operator through a control panel 15 coupled to the control unit and which is provided at the top part of a post 16 located at the extremity of the front barrier 17 (see FIGS. 4 to 6), the control panel 15 being preferably located in an area allowing the operator to oversee the access zone to the machine in its entirety when operating the control panel 15. The control panel 15 comprises in particular push buttons to control the displacement of the mobile carriage 2 from its working position to its maintenance position and vice versa, as well as push buttons to control the above-mentioned quick-release mechanism of numbering cylinder 24.

The above-described preferred actuation/initiation system is particularly advantageous in that it ensures a highly secure operation of the mobile carriage 2. Indeed, the system first needs to be initiated by an operator using the control button 12. When actuating this control button 12, the operator directly oversees the area where the mobile carriage is located and can ensure than no one is standing in the displacement path of the mobile carriage 2. Upon activation of the control button 12, the detection means 11 are activated and the access zones 9, 9' are accordingly monitored. At the same time, operation via the control panel 15 is enabled. Any subsequent attempt from a human operator to step on the middle floor 7 of the printing machine will thus be detected, preventing or stopping displacement of the mobile carriage 2. As long as the presence of a human operator is not detected within the access zones 9, 9', the operator can securely initiate and control displacement of the mobile carriage 2 using the control panel 15.

The security arrangement according to the present invention, as described hereinabove advantageously permits to increase the displacement speed of the mobile carriage 2 by a factor of 10 without this being detrimental to the security of human operators. A displacement speed of the order of 10 meters per minute can for instance be achieved thanks to the invention, as compared to prior art machines having no access monitoring function for which the displacement speed of the mobile carriage is typically limited to 1 meter per minute for security reasons. This higher displacement speed is also an advantage as compared to the solution described in EP 0 444 227 where the displacement speed of the mobile carriage must also be limited in order to avoid injuries.

A high displacement speed is particularly advantageous in the context of numbering machines as illustrated in the figures, because human interventions on such machines are more frequent. Indeed, when operating numbering machines, one in particular often has to get access to the numbering cylinders (23 and 24 in FIG. 1) in order to perform maintenance operations on the numbering devices carried by these numbering cylinder. A high displacement speed of the mobile carriage 2 enables to reduces the time during which the machine is stopped in order to carry out the maintenance operations.

Similar security arrangements as that described hereinabove can be provided in any machines having at least one mobile carriage. Further, similar security arrangements are also possible in cases where the mobile carriage or carriages is/are suspended below supporting rails disposed above the carriage or carriages, for instance in a machine as described in U.S. Pat. No. 5,899,145 or WO 03/047862.

As a possible improvement of the above-described security arrangement, it could be advantageous to dispose additional detection means on the mobile carriage 2 in order to detect any interference or resistance caused by an obstacle remaining in the path of the mobile carriage 2 (such as tools, etc.). Such additional detection means could for instance include pressure sensitive pads (or any other adequate detection means) provided on the outer side and inner side of the mobile carriage 2 along its displacement path.

The invention claimed is:

1. Sheet-fed or web-fed printing machine comprising:
    a main unit,
    at least one mobile inking carriage adapted to be coupled to the main unit for cooperation therewith during printing operations and to be moved away from the main unit during maintenance operations, said mobile inking carriage comprising at least one inking device,
    a control unit for controlling displacement of said mobile inking carriage toward and away from said main unit, and
    an access zone surrounding at least partly said mobile inking carriage for allowing a human operator to get access to said main unit and mobile inking carriage, which access zone lies outside of a displacement path of said mobile inking carriage,
    wherein said printing machine further comprises detection means for monitoring said access zone and detecting presence of a human operator within said access zone,
    wherein said optical detection means are located on a floor part of the printing machine so as optically scan a horizontal plane lying parallel above said access zone and close to the level of said access zone and detect trespassing of a human operator onto said access zone,
    wherein the floor part is made extending on each side of the main unit and the mobile inking carriage and is partially surrounded by barriers and side panels so as to force a human operator to pass through said access zone to get access to the main unit or to the mobile inking carriage,
    and wherein said control unit is operatively connected to said detection means so as to interrupt or prevent displacement of said mobile inking carriage upon detection of the presence of a human operator within said access zone before the human operator penetrates in the displacement path of the mobile inking carriage.

2. Printing machine according to claim 1, wherein said detection means comprise optical detection means for optically scanning said access zone.

3. Printing machine according to claim 1, wherein said detection means comprise pressure-sensitive means disposed on a floor part of the printing machine in said access zones for detecting trespassing of a human operator onto said access zone.

4. Printing machine according to claim 1, wherein said main unit and said mobile inking carriage are accessible from two sides of the printing machine and wherein said access zone comprises a first zone extending along a first side of the printing machine parallel to the displacement path of the mobile inking carriage and a second zone extending along a second side of the printing machine parallel to the displacement path of the mobile inking carriage, each zone being provided with corresponding detection means.

5. Printing machine according to claim 1, further comprising an activation device actuable by a human operator, which activation device is coupled to said detection means and is adapted to activate said detection means and to initiate said control unit, said activation device being placed in direct vicinity of said access zone so as to allow a human operator to oversee said access zone in its entirety when actuating said activating device.

6. Printing machine according to claim 5, further comprising a control panel actuable by a human operator for controlling displacement of said mobile carriage, said control panel being operatively coupled to the activation device and being enabled upon actuation of said activation device.

7. Printing machine according to claim 5, wherein said activation device is actuable by foot and is placed on a floor part of said printing machine in direct vicinity of said access zone.

8. Printing machine according to claim 1, wherein barriers and/or side panels are placed along outer limits of said access zone for restricting access to said access zone.

9. Printing machine according to claim 1, wherein said mobile inking carriage is displaceable along supporting rails disposed on a floor part of said machine.

10. Printing machine according to claim 1, wherein the mobile inking carriage is displaceable along supporting rails disposed above said mobile inking carriage.

11. Printing machine according to claim 1, wherein said mobile inking carriage is provided with additional detection means for detecting presence of an obstacle along the displacement path of the mobile inking carriage.

12. Printing machine according to claim 11, wherein said additional detection means are provided on the mobile inking carriage.

13. Printing machine according to claim 1, wherein a displacement speed of the mobile inking carriage is of the order of 10 meters per minute.

14. Printing machine according to claim 1, wherein said printing machine is a numbering machine with at least one numbering cylinder located in said main unit, which at least one numbering cylinder is inked by at least one inking device, said mobile inking carriage being adapted to be moved away from the main unit so as to allow maintenance operations to be carried out on said at least one numbering cylinder.

\* \* \* \* \*